(12) United States Patent
Gauld

(10) Patent No.: US 8,997,163 B2
(45) Date of Patent: *Mar. 31, 2015

(54) SYSTEM AND METHOD TO DISTRIBUTE VIDEO-ON-DEMAND CONTENT

(71) Applicant: AT&T Intellectual Property I, LP, Atlanta, GA (US)

(72) Inventor: Andrew G. Gauld, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,826

(22) Filed: Apr. 10, 2013

(65) Prior Publication Data

US 2013/0227605 A1     Aug. 29, 2013

Related U.S. Application Data

(63) Continuation of application No. 12/324,262, filed on Nov. 26, 2008, now Pat. No. 8,443,411.

(51) Int. Cl.
| | |
|---|---|
| H04N 7/173 | (2011.01) |
| H04N 7/10 | (2006.01) |
| H04N 21/234 | (2011.01) |
| H04N 21/472 | (2011.01) |
| H04N 21/61 | (2011.01) |
| H04N 21/6405 | (2011.01) |
| H04N 21/482 | (2011.01) |

(52) U.S. Cl.
CPC ... *H04N 21/23424* (2013.01); *H04N 21/47202* (2013.01); *H04N 21/6125* (2013.01); *H04N 21/6405* (2013.01); *H04N 21/482* (2013.01)
USPC .............................. 725/100; 725/93; 725/131

(58) Field of Classification Search
CPC .................... H04N 21/2343; H04N 21/23805; H04N 21/26233; H04N 21/4516; H04N 21/6405
USPC ........................ 725/97, 100, 132, 134, 92–93
See application file for complete search history.

(56) References Cited

U.S. PATENT DOCUMENTS

| | | | |
|---|---|---|---|
| 7,222,354 B1 * | 5/2007 | Ching et al. ..................... 725/35 |
| 2002/0029282 A1 * | 3/2002 | Buddhikot et al. ............ 709/231 |
| 2004/0216164 A1 * | 10/2004 | Hayhurst ......................... 725/86 |
| 2007/0162803 A1 * | 7/2007 | Dervisoglu et al. .......... 714/726 |
| 2009/0055880 A1 * | 2/2009 | Batteram et al. .............. 725/100 |

* cited by examiner

*Primary Examiner* — Junior Mendoza
*Assistant Examiner* — Carmine Malangone
(74) *Attorney, Agent, or Firm* — Hoffmann & Baron, LLP

(57) ABSTRACT

Method, system and computer-readable medium to distribute VOD content are disclosed. A method of displaying video content includes accessing an association table for video-on-demand (VOD) content. The association table includes a first segment entry associated with a first video segment of a first length and a second segment entry associated with a second video segment of a second length that is longer than the first length. The first segment entry includes a first multicast group ID and the second segment entry includes a second multicast group ID. The method further includes receiving the first video segment via the first multicast group ID, displaying the received first video segment, and receiving the second video segment via the second multicast group ID within a period of time of displaying the first video segment.

20 Claims, 7 Drawing Sheets

| | Segment ID | Multicast Group ID | Segment Length |
|---|---|---|---|
| 208 | 0 | 224.1.2.1:1234 | 3000 packets |
| 210 | 1 | 224.1.2.2:1234 | 4500 packets |
| 212 | 2 | 224.1.2.3:1234 | 6750 packets |
| 214 | : | : | : |
| 216 | Segment N | 224.1.2.N:1234 | N Packets |

| | Segment ID | Multicast Group ID | Segment Length |
|---|---|---|---|
| 208 | 0 | 224.1.2.1:1234 | 3000 packets |
| 210 | 1 | 224.1.2.2:1234 | 4500 packets |
| 212 | 2 | 224.1.2.3:1234 | 6750 packets |
| 214 | : | : | : |
| 216 | Segment N | 224.1.2.N:1234 | N Packets |

SYSTEM AND METHOD TO DISTRIBUTE VIDEO-ON-DEMAND CONTENT

CROSS REFERENCE TO RELATED APPLICATION

This application is a continuation of U.S. patent application Ser. No. 12/324,262 filed on Nov. 26, 2008, which is incorporated herein by reference in its entirety.

TECHNICAL FIELD

The present application relates generally to digital video distribution systems. More specifically, the present application is directed to a system, method and computer storage medium to distribute video-on-demand (VOD) content to at least one video content receiver.

BACKGROUND

Recent developments in digital technology have spurred the development and deployment of digital video transmission systems. Video content is typically distributed by satellite and cable service providers. More recently, video content has also been distributed via the Internet Protocol (IP) by telecommunication service providers.

Video content may be received by end users' video content receivers, such as digital set top box (STB) devices, which decode the video content for display on video display devices (e.g., televisions) connected to the video content receivers. Most of the video distribution systems also provide video-on-demand (VOD), permitting on-demand transmission of pre-recorded video content (e.g., one or more movies).

One existing VOD distribution mechanism includes transmission and recording of an entire video content (e.g., a movie) via a digital video recorder (DVR) of the video content receiver. Another VOD distribution mechanism includes multicast transmission of the video content at a predetermined start time via a single channel or multicast transmission of the video content via multiple channels staggered in start time. Yet another VOD distribution mechanism includes unicast transmission of the video content to each video content receiver upon demand. Hybrid unicast/multicast distribution mechanisms have also been provided.

The foregoing VOD distribution mechanisms have drawbacks. The storage of the video content via the DVR requires a significant amount of bulk storage at the video content receiver and may necessitate a playback delay until the entire video content is received by the video content receiver (e.g., at non-peak time). Multicast transmission via the single channel or multiple time-staggered channels necessitates a playback delay until the predetermined start time and requires significant network bandwidth for the time-staggered channels. Unicast transmission also requires significant network bandwidth as the video content may be individually transmitted to multiple video content receivers.

SUMMARY

In accordance with a particular embodiment, a method of displaying video content is disclosed. The method includes accessing an association table for video-on-demand (VOD) content. The association table includes a first segment entry associated with a first video segment of a first length and a second segment entry associated with a second video segment of a second length that is longer than the first length. The first segment entry includes a first multicast group ID and the second segment entry includes a second multicast group ID. The method further includes receiving the first video segment via the first multicast group ID, displaying the received first video segment, and receiving the second video segment via the second multicast group ID within a period of time of displaying the first video segment.

In accordance with another embodiment, video content receiver to display video content is disclosed. The video content receiver includes a receiver module and a video display module. The receiver module is configured to access an association table for video-on-demand (VOD) content. The association table includes a first segment entry associated with a first video segment of a first length and a second segment entry associated with a second video segment of a second length that is longer than the first length. The first segment entry includes a first multicast group ID and the second segment entry includes a second multicast group ID. The receiver module is further configured to receive the first video segment via the first multicast group ID. Yet further, the receiver module is configured to receive the second video segment via the second multicast group ID within a period of time to display the first video segment. The video display module is configured to display the received first video segment.

In accordance with yet another embodiment a computer-readable storage medium is disclosed. The computer-readable storage medium includes operational instructions that, when executed by a processor, cause the processor to access an association table for video-on-demand (VOD) content. The association table includes a first segment entry associated with a first video segment of a first length and a second segment entry associated with a second video segment of a second length that is longer than the first length. The first segment entry includes a first multicast group ID and the second segment entry includes a second multicast group ID. The computer-readable storage medium further includes operational instructions that, when executed by a processor, cause the processor to receive the first video segment via the first multicast group ID, display the received first video segment, and receive the second video segment via the second multicast group ID within a period of time of displaying the first video segment.

In accordance with still another embodiment, a method of distributing video content is disclosed. The method includes segmenting video-on-demand (VOD) content into a plurality of video segments of increasing length according to a geometric progression. The method further includes distributing each of the plurality of video segments to a respective multicast group transmission module associated with a multicast group of each of the plurality of video segments. The method also includes multicasting in a loop each of the plurality of video segments from the respective multicast group transmission module at a transmission rate that is greater than a display rate associated with each of the plurality of video segments.

In accordance with a further embodiment, a system to distribute video content is disclosed. The system includes a segment generator module, a segment distribution module, and a plurality of multicast group transmission modules. The segment generator module is configured to segment video-on-demand (VOD) content into at least a plurality of video segments of increasing length according to a geometric progression. The segment distribution module is configured to distribute each of the plurality of video segments to a respective multicast group transmission module associated with a multicast group of each of the plurality of video segments. Each of the plurality of multicast group transmission modules is configured to multicast in a loop a respective video segment of the plurality of video segments at a transmission rate that is greater than a display rate associated with the respective video segment.

In accordance with yet another embodiment, a computer-readable storage medium is disclosed. The computer-readable medium includes operational instructions that, when executed by a processor, cause the processor to segment video-on-demand (VOD) content into a plurality of video segments of increasing length according to a geometric progression. The computer-readable storage medium further includes operational instructions that, when executed by a processor, cause the processor to distribute each of the plurality of video segments to a respective multicast group transmission module associated with a multicast group of each of the plurality of video segments. The computer-readable storage medium further includes operational instructions that, when executed by a processor, cause the processor to multicast in a loop each of the plurality of video segments from the respective multicast group transmission module at a transmission rate that is greater than a display rate associated with each of the plurality of video segments.

BRIEF DESCRIPTION OF THE DRAWINGS

Some embodiments are illustrated by way of example and not limitation in the figures of the accompanying drawings in which.

DETAILED DESCRIPTION

System, method and computer-readable storage medium for distributing video-on-demand (VOD) content are disclosed. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
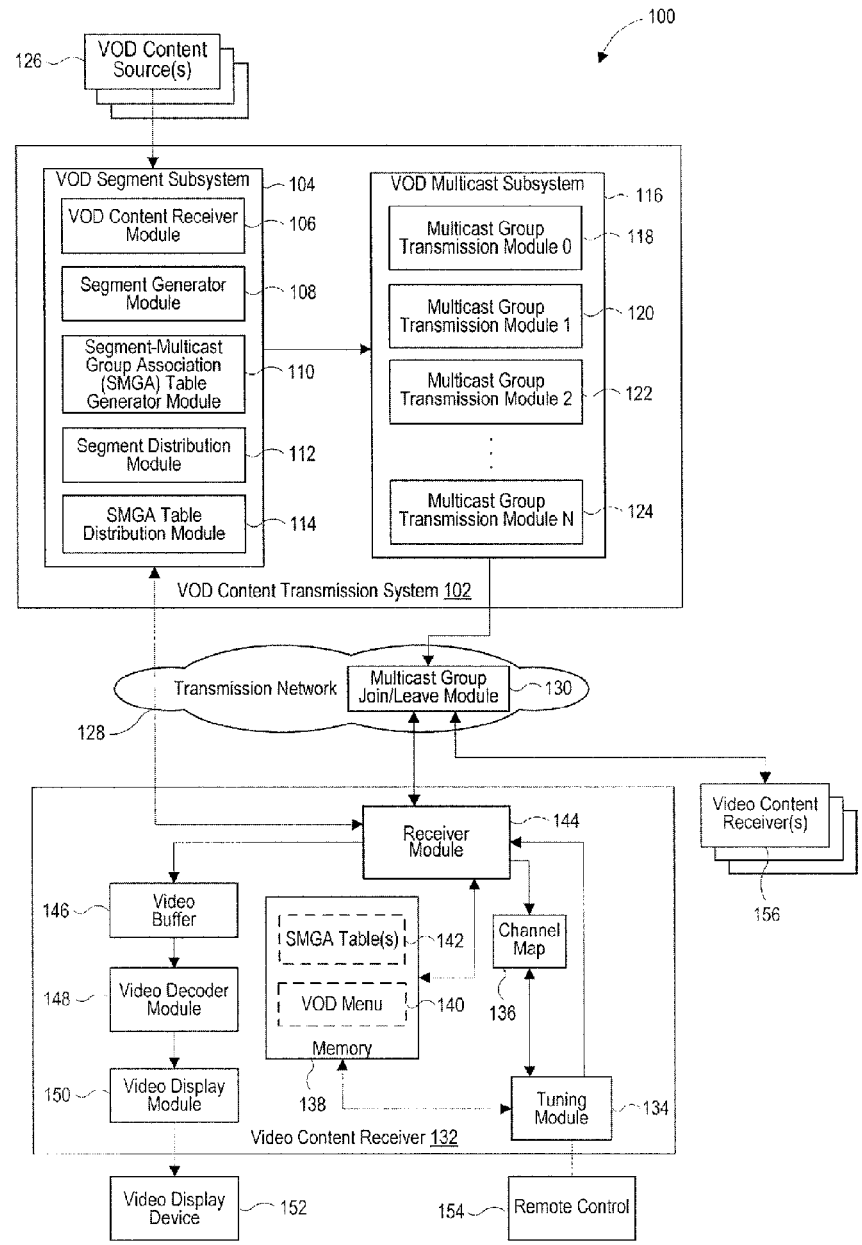
FIG. 1 is a block diagram of an example video distribution system to distribute video-on-demand (VOD) content to at least one video content receiver.

FIG. 1 is a block diagram of an example video distribution system 100 that transmits video-on-demand (VOD) content to at least one video content receiver 132, 156. The video distribution system 100 includes a VOD content transmission system 102, at least one VOD content source 126, a transmission network 128, and at least one video content receiver 132, 156. Although only video content receiver 132 is described in detail below for clarity and brevity purposes, the other video content receivers 156 may be similar to or different than the video content receiver 132. Furthermore, although one VOD content transmission system 102 is shown and described for clarity and brevity purposes, the video distribution system 100 may include multiple VOD content transmission systems, with each VOD content transmission system servicing multiple video content receivers. The transmission network 128 enables communication between the VOD content transmission system 102 and the video content receivers 132, 156.

The VOD content transmission system 102 is configured to receive VOD content from at least one VOD content source 126 and to distribute the VOD content via multicast transmission to at least one video content receiver 132, 156. The VOD content transmission system 102 includes a VOD segment subsystem 104 and a VOD multicast subsystem 116.

Now with reference to the VOD segment subsystem 104, the VOD segment subsystem 104 is configured to segment VOD content (e.g., a movie) into at least plural video segments of successively increasing length and to associate each of the video segments with a different multicast group. More specifically, the VOD segment subsystem 104 includes a VOD content receiver module 106, a segment generator module 108, a segment-multicast group association (SMGA) table generator module 110, a segment distribution module 112 and a SMGA table distribution module 114.

The VOD content receiver module 106 is configured to receive VOD content (e.g., a movie) from at least one VOD content source 126. The VOD content may be in an analog or digital format (e.g., original format) such as Phase Alternating Line (PAL), Sequentiel Couleur a Memoire (SECAM), National Television System Committee (NTSC), High-definition Television (HDTV), Moving Pictures Experts Group (MPEG)-2 format, MPEG-4 format, or another available or yet to be implemented original format. The VOD content receiver module 106 is further configured to transcode, if necessary, the received VOD content from the original format in which VOD content was received to a target format suitable for distribution over the transmission network 128 and further suitable for reception by the at least one video content receiver 132, 156 (e.g., MPEG-2 or MPEG-4). Depending on the original format of the received VOD content, transcoding may or may not be performed by the VOD content receiver module 106. Transcoding may also be fully or partially performed by the VOD content receiver module 106, segment generator module 108, segment distribution module 112, or the multicast group transmission modules 118-124 of VOD multicast subsystem 116 described below.

The VOD content in the target format should further be partitionable into packets, each of which identifies its position within the VOD content (e.g., via a packet sequence number, a packet starting offset within the VOD content, or a timestamp) to facilitate sequential ordering when packets are received out of order by the at least one video content receiver 132, 156. The packets should be sized to be distributed over the transmission network 128 without fragmentation. The VOD content in the target format should further include sufficient redundancy (e.g., forward error correction codes) to enable the at least one video content receiver 132, 156 to decode and display the VOD content in presence of normal packet loss over the transmission network 128.

The segment generator module 108 is configured to segment the VOD content into at least plural video segments of increasing lengths that accounts at least for the rates of download and presentation of VOD content such that each successive video segment may be transmitted within a presentation time of a previous video segment to provide for continuous presentation of the plural video segments via the at least one video content receiver 132, 156. For example, the segment generator module 108 may segment the VOD content into at least plural video segments of lengths that increase according to a geometric progression (or modified geometric progression), where a successive video segment generally varies from a preceding video segment by a ratio of a rate of download (Rd) divided by a rate of presentation (Rp) and where Rp<Rd. In certain instances described below, the segmentation may generate one or more additional video segments that may be modified from the geometric progression. Hereinafter, plural video segments will describe the at least plural video segments of increasing lengths according to a geometric progression and the one or more additional video segments according to a modified geometric progression that may not be of increasing lengths. A method of segmenting the VOD content will be set forth more specifically with reference to FIG. 4 below.

The SMGA table generator module 110 generates a segment-multicast group association (SMGA) table that includes plural segment entries, each of which associates a video segment of the VOD content with a different multicast group and provides the segment's length. An example SMGA table is illustrated in and described with reference to FIG. 2. The SMGA table may be generated before, after or concurrently with the generation of the plural video segments by the segment generator module 108.

The segment distribution module 112 distributes the plural video segments to the VOD multicast subsystem 116. The SMGA table distribution module 114 distributes the SMGA table to the at least one video content receiver 132, 156 and may optionally also distribute the SMGA table to the VOD multicast subsystem 116 to facilitate the allocation of plural video segments associated with the multicast groups to multicast group transmission modules 118-124 of VOD multicast subsystem 116.

In an alternative embodiment, instead of distributing the SMGA table to the VOD multicast subsystem 116, different multicast groups that are identified in the SMGA table may be pre-assigned sequentially (e.g., different multicast groups are pre-assigned sequentially to multicast group transmission modules 118-124) and the VOD multicast subsystem 116 may allocate the plural video segments to the pre-assigned multicast groups in reception order. For example, a first video segment would be allocated to a first transmission module 118, a second video segment would be allocated to a second transmission module 120, a third video segment would be allocated to a third transmission module 122, . . . , and an N video segment would be allocated to an N transmission module 124.

As another alternative embodiment, instead of distributing the SMGA table to the at least one video content receiver 132, 156 and optionally to the VOD multicast subsystem 116, the SMGA table distribution module 114 may distribute plural parameters that may be used by the at least one video content receiver 132, 156 and optionally to the VOD multicast subsystem 116 to generate the SMGA table. For example, the plural parameters that include plural constraints (Td, Ta, Tm, Rd, and Rp of FIG. 4) and a first multicast group ID (e.g., combination of multicast group IP address and port) in a sequence of multicast group IDs may be distributed to the at least one video content receiver 132, 156 and optionally to the VOD multicast subsystem 116, which may then generate the SMGA table. As described with reference to FIG. 4, the foregoing constraints may be used to determine a number of segment entries and their lengths in the SMGA table. The first multicast group ID associated with a first entry in the SMGA table may be used to determine multicast group IDs for other entries of the SMGA table, where multicast group IDs follow a predictable sequence (e.g., multicast group IDs are consecutive).

Now with reference to the VOD multicast subsystem 116, the VOD multicast subsystem 116 is configured to receive the plural video segments distributed by the segment distribution module 112 of the VOD segment subsystem 104 and optionally configured to receive the SMGA table distributed by the SMGA table distribution module 114 of the VOD segment subsystem 104. The VOD multicast subsystem 116 is further configured to allocate the plural video segments to corresponding multicast group transmission modules 118-124. More specifically, each of the multicast group transmission modules 118-124 may be associated with a particular multicast group indicated in the SMGA table. Although example multicast group transmission modules 0, 1, 2, . . . , N (referenced as 118-124) are shown, it will be appreciated that the VOD multicast subsystem 116 may include greater or fewer multicast group transmission modules to accommodate the number of video segments that are distributed from the VOD segment subsystem 104. Each of the multicast group transmission modules 118-124 is configured to multicast its allocated video segment in a loop via its associated multicast group. It is noted that a rate of download (Rd) of each successive video segment via its associated multicast group transmission module is greater than a rate of presentation (Rp) of the video segment via the at least one video content receiver 132, 156.

The transmission network 128 may include one or more of a long haul transport network (e.g., a gigabit Ethernet network, an Asynchronous Transfer Mode (ATM) network, a frame relay network), a wireless network (e.g., a satellite network, a Wi-Fi network, or another wireless network), other public or private networks, or any combination thereof. The transmission network 128 may also include connections, such as fiber to the home (FTTH), fiber to the node (FTTN), telephone (e.g., digital subscriber line (DSL)), coaxial cable, hybrid fiber/coaxial, wireless or any other combination thereof. The foregoing is not exhaustive and alternate or additional transmission networks as well as connections may be employed to interconnect the VOD content transmission system 102 to the video content receivers 132, 156.

A multicast group join/leave module 130 is associated with or provisioned within the transmission network 128. The multicast group join/leave module 130 is configured to receive a request from the at least one video content receiver 132, 156 to join a multicast group associated with a multicast group transmission module, to transmit a video segment from the multicast group transmission module to the at least one video content receiver 128, 150 joined to the multicast group, and further configured to receive a request from the at least one video content receiver 132, 156 to leave the multicast group. It is noted that the multicast group join/leave module 130 is configured to concurrently service join/leave requests for disparate multicast groups and to concurrently transmit video segments associated with the disparate multicast groups from the VOD multicast subsystem 116 to the video content receivers 132, 156. The multicast groups associated with the transmission of respective video segments of VOD content (via multicast group transmission modules 118-124) may be associated with a certain television channel of an Internet Protocol Television (IPTV) system, as will be described herein.

The video content receivers 132, 156 are configured to receive VOD content from the VOD content transmission system 102 via the transmission network 128. For brevity and clarity, the following description describes the components of the video content receiver 132. Other video content receivers 156 may be similar to or different than the video content receiver 132. For example, the video content receiver 132 may be a set top box (STB) device and the video content receivers 156 may include mobile video content receivers, STB devices, as well other video content receiver devices, whether wired or wireless, capable of receiving VOD content over the transmission network 128.

Now with reference to the video content receiver 132, the video content receiver 132 is configured to receive a user selection of VOD content and to request and receive for display via a display channel the video segments of the VOD content that are multicast via disparate multicast groups. The video content receiver 132 includes a tuning module 134, a channel map 136, a memory 138 maintaining a VOD menu 140 and at least one SMGA table 142, a receiver module 144, a video buffer 146, a video decoder module 148 and a video display module 150.

In one embodiment, the tuning module 134 receives a VOD content (e.g., a movie) selection by receiving a channel selection from a user (via the remote control 154), the channel being associated with the VOD content the user would like view. The tuning module 134 queries the channel map 136 to determine a certain SMGA table 142 to access from the memory 138 for displaying the VOD content via the channel. The tuning module 134 determines whether the SMGA table 142 associated with the channel is stored in the memory 138. If the certain SMGA is stored in memory 138, the tuning module 134 instructs the receiver module 144 to access and traverse the video segment entries of the SMGA table 142 to display the VOD content via the channel, as described herein. If the SMGA table associated with the channel is not stored in the memory 138, the tuning module 134 instructs the receiver module 144 to request the SMGA table from the VOD content transmission system 102 (via SMGA distribution module 114 of the VOD segment subsystem 104). The receiver module 144 stores the received SMGA table into the memory 138 (e.g., SMGA table 142) and informs the tuning module 134. Alternatively to receiving the SMGA table, the receiver module 144 may receive plural parameters associated with the VOD content from the VOD content transmission system 102. The receiver module 144 may generate the SMGA table using the plural parameters and may further store the generated SMGA table into the memory 138 (e.g., SMGA table 142). Thereafter, the tuning module 134 instructs the receiver module 144 to access the segment entries of SMGA table 142 to display the video segments of the VOD content via the channel.

In another embodiment, the tuning module 134 receives a VOD content (e.g., a movie) selection by receiving an entry (via the remote control 154) in a VOD menu 140 of the VOD content the user would like view, the entry associating the VOD content with a channel via which the VOD content is to be displayed. The tuning module 134 queries the channel map 136 to determine a certain SMGA table 142 to access from the memory 138 to display the VOD content via the channel. The tuning module 134 determines whether the SMGA table 142 associated with the channel is stored in the memory 138. If the certain SMGA is stored in memory 138, the tuning module 134 instructs the receiver module 144 to access and traverse the video segment entries of the SMGA table 142 to display the VOD content via the channel, as described herein. If the SMGA table associated with the channel is not stored in the memory 138, the tuning module 134 instructs the receiver module 144 to request the SMGA table from the VOD content transmission system 102. The receiver module 144 stores the received SMGA table into the memory 138 (e.g., SMGA table 142) and informs the tuning module 134. Alternatively to receiving the SMGA table, the receiver module 144 may receive plural parameters associated with the VOD content from the VOD content transmission system 102. The receiver module 144 may generate the SMGA table using the plural parameters and may further store the generated SMGA table into the memory 138 (e.g., SMGA table 142). Thereafter, the tuning module 134 instructs the receiver module 144 to access the segment entries of SMGA table 142 to display the video segments of the VOD content via the channel.

The receiver module 144 accesses the segment entries of SMGA table 142 to display the selected VOD content via the associated channel. The receiver module 144 traverses the segment entries of the SMGA table 142 from a first entry through to a final entry, retrieving at least a multicast group ID (e.g., a combination of multicast group IP address and port) and a segment length of each segment entry. For each segment entry, the receiver module 144 joins a multicast group (via transmission network 130) identified by multicast group ID, receives an associated video segment (determined by segment length) from a multicast group transmission module (e.g., multicast transmission module 118) of the VOD multicast subsystem 116, and leaves the multicast group after the associated video segment is received. The video content of the video segment is generally received asynchronously. The receiver module 144 provides the video buffer 146 with the received video content of each video segment received and the video buffer 146 buffers the received video content into synchronous order, reordering the video content buffered as may be required for each video segment.

The video decoder module 148 decodes the video content of each video segment buffered in the video buffer 146 and the video display module 150 transmits the decoded video content to the video display device 152 for display to the user. After the video decoder 148 and the video display module 150 begin to decode and display each buffered video segment, the receiver module 144 retrieves a multicast group ID and a segment length of a successive segment entry of the SMGA table 142, joins a multicast group identified by multicast group ID and buffers a successive video segment (determined by segment length) from a multicast group transmission module (e.g., multicast transmission module 120) of the VOD multicast subsystem 116. It is noted that the successive video segment is received before the completion of the decoding and the display of a previous video segment. The receiver module 144 iterates or traverses through the segment entries of the SMGA table 142 to display the video segments of the VOD content via the associated channel using different multicast groups (e.g., provided by multicast group transmission modules 118-124).

Figures 2, 3:
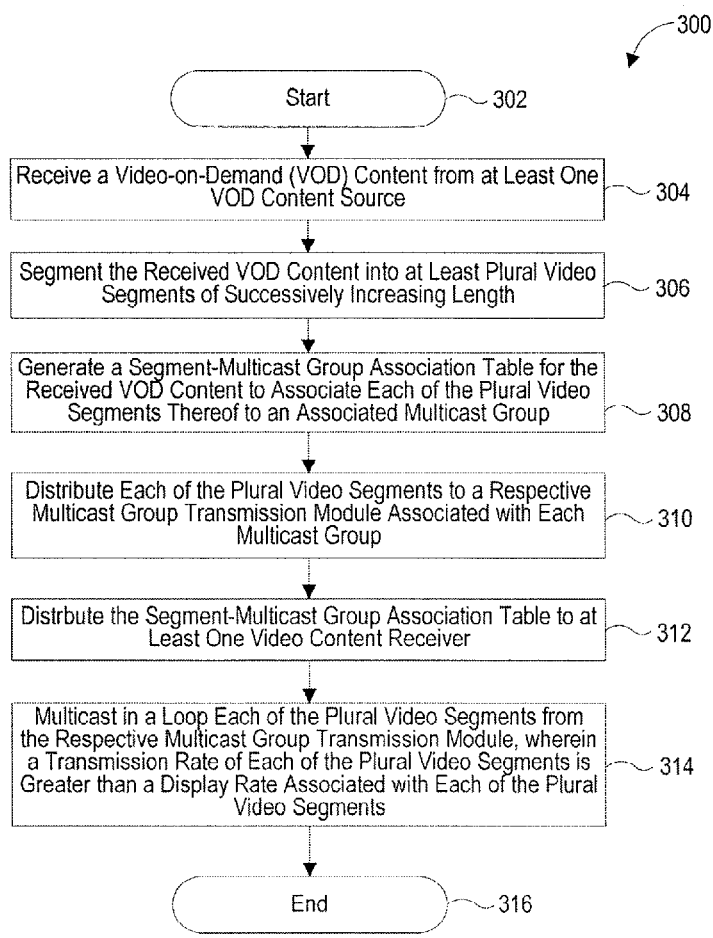
FIG. 2 is an example segment-multicast group association table.
FIG. 3 is a flowchart that illustrates an example method of distributing the VOD content from a VOD content transmission system to at least one receiver device.

FIG. 2 is an example segment-multicast group association (SMGA) table 200. The SMGA table 200 includes plural segment entries 208-216. Each of the plural segment entries includes a segment ID 202 that identifies a certain video segment (e.g., video segment 0, video segment 1, . . . , video segment N) of VOD content (e.g., a movie), a multicast group ID 204 that indicates a multicast group (e.g., combination of multicast group IP address and port) associated with the certain video segment, and a segment length 206 that indicates a segment length of the certain video segment.

For example, segment ID 208 (e.g., <0>) identifies a certain video segment to be received by the video content receiver 132 via multicast group ID 204 (e.g., <222.1.2.1: 1234>) and that video segment's length is identified by segment length 206 (e.g., 3000 packets); segment ID 210 (e.g., <1>) identifies a successive video segment to be received by the video content receiver 132 via multicast group ID 204 (e.g., <222.1.2.2:1234>) and that video segment's segment length is identified by segment length 206 (e.g., 4500 packets); segment ID 212 (e.g., <2>) identifies a further successive video segment to be received by the video content receiver 132 via multicast group ID 204 (e.g., <222.1.2.3:1234>) and that video segment's length is identified by segment length 206 (e.g., 6750 packets); segment ID 216 (e.g., <N>) identifies a final video segment to be received by the video content receiver 132 via multicast group ID 204 (e.g., <222.1.2.N: 1234>) and that video segment's length is identified by segment length 206 (e.g., <N> packets). It is noted that the designation "N" is used as placeholder and it is not intended to represent the same values across the SMGA table 200 of FIG. 2. Additional segment entries 214 may be provided as necessary for particular VOD content. Alternatively, fewer segment entries than those illustrated in the sample SMGA table 200 may be provided for certain VOD content. In the example SMGA table 200, the segment lengths 206 of the segment entries 208-216 increase successively according to a geometric progression, as described herein with reference to FIG. 4.

FIG. 3 is a flowchart that illustrates an example method 300 of distributing VOD content from a VOD content transmission system 102 to at least one video content receiver 132, 156. The method 300 starts at operation 302. At operation 304, VOD content (e.g., a movie) is received from at least one VOD content source. For example, the VOD content receiver module 106 of the VOD segment subsystem 104 may receive VOD content from VOD content source 126. At operation 306, the received VOD content is segmented or subdivided into at least plural video segments of successively increasing length. As noted above, the VOD content may be segmented in the at least plural video segments of successively increasing length and one or more additional video segments that may not be of increasing lengths. For example, the segment generator module 108 may segment the received VOD content into the at least plural video segments according to a geometric progression, as described herein with reference to FIG. 4 below.

Further with reference to method 300, at operation 308 a SMGA table is generated for the received VOD content to associate each of the plural video segments thereof to an associated multicast group. For example, the SMGA generator module 110 may generate a SMGA table 200 as illustrated in FIG. 2. At operation 310, each of the plural video segments is distributed to a respective multicast group transmission module that is associated with each multicast group. For example, the segment distribution module 112 may distribute the plural video segments to the VOD multicast subsystem 116 for allocation to a corresponding multicast group transmission module 118-124.

Yet further with reference to method 300, at operation 312 the SMGA table is distributed to at least one video content receiver. For example, the SMGA distribution module 114 distributes the SMGA table to video content receiver 132. At operation 314, each of the plural video segments is multicast in a loop from the respective multicast group transmission module, wherein the transmission rate of each video segment is greater than a display rate of each video segment. For example, the VOD multicast system 116 multicasts the plural video segments in a loop via multicast group transmission modules 118-124. The method 300 ends at operation 316.

Figure 4:
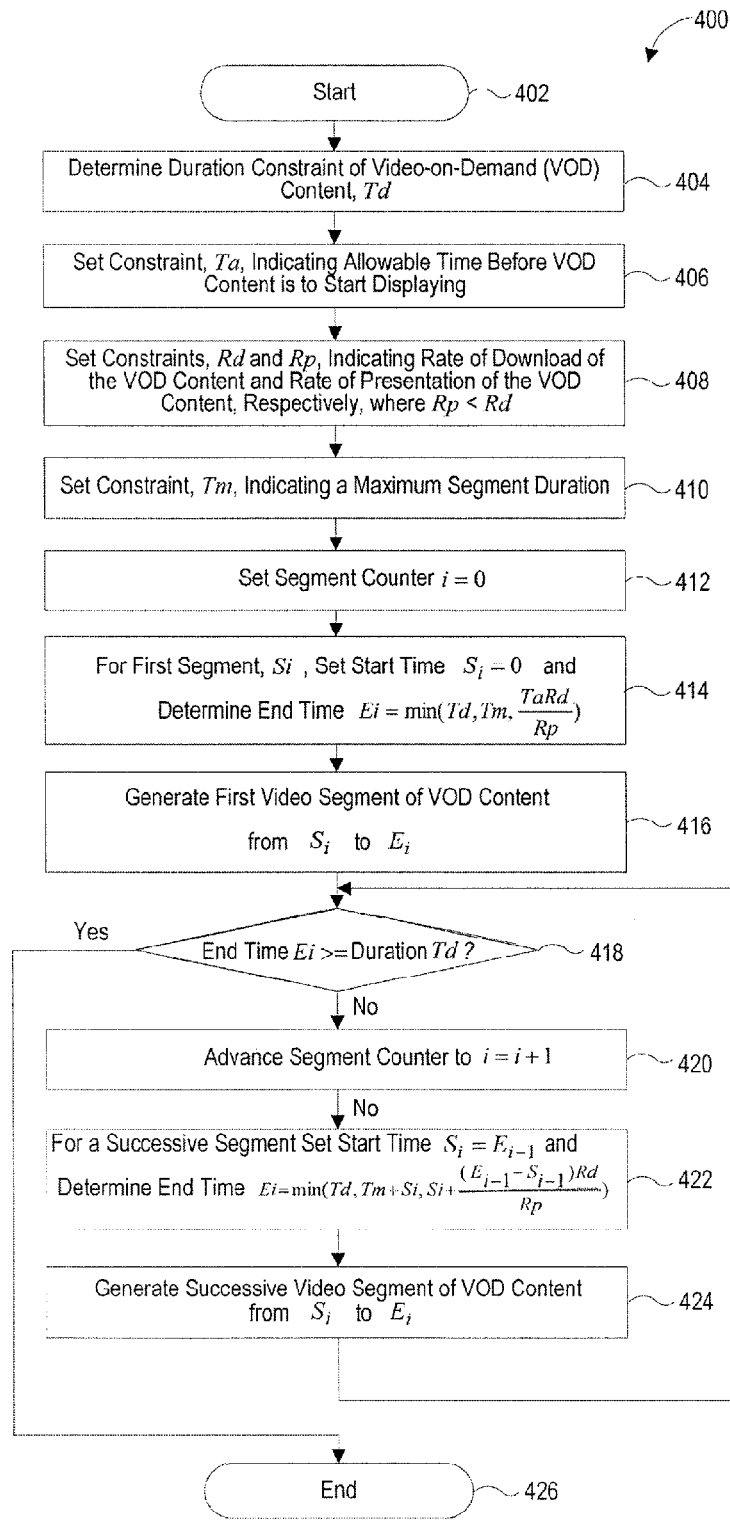
FIG. 4 is a flowchart that illustrates an example method of segmenting VOD content into plural video segments of generally successively increasing length.

FIG. 4 is a flowchart that illustrates an example method 400 of segmenting VOD content into at least plural video segments of generally successively increasing lengths. The method 400 may be performed by the segment generator module 108 of the VOD segment subsystem 104 of FIG. 1. The method 400 starts at operation 402. At operation 404, duration of the VOD content (e.g., a movie), Td, is determined. For example, constraint Td may be 120 minutes. At operation 406, a constraint, Ta, which indicates an allowable time before the VOD content is to start displaying, is set. For example, constraint Ta may be set to ½ minute. At operation 408, constraints, Rd and Rp, which indicate a rate of download of the VOD content and a rate of presentation of the VOD content, are set, respectively. For example, constraint Rd may be set to 8 Mbps and constraint Rp may be set 4 Mbps. The rate of download, Rd, is an engineering compromise: a higher rate of download reduces an aggregate transmission rate of the multicast group transmission modules 118-124, while a lower rate of download reduces a minimum rate that the at least one video content receiver 132, 156, and its connection to the transmission network, must be capable of sustaining. The rate of playback is a function of a format of the VOD content and a quality of encoding of the VOD content: a format with a better compression will yield a lower rate of playback as will an encoding with lower frame rate, lower screen resolution, or more visible encoding artifacts. For example, MPEG-2 as stored on digital video disks (DVDs) typically uses a bit rate between about 4 Mbps and 8 Mbps.

At operation 410 a constraint, Tm, which indicates maximum segment duration, is set. For example, constraint Tm may be set to 60 minutes. Other Tm values may of course be used. The maximum segment duration, Tm, is an engineering compromise: a higher Tm requires a larger video buffer 146 in the at least one video content receiver 132, 156, while a lower Tm may require more multicast groups and associated multicast group transmission modules 118-124, as well as a higher aggregate transmission rate by the VOD Multicast Subsystem 116.

At operation 412, a segment counter is set to zero (e.g., i=0). At operation 414, a start time for a first video segment (e.g., i=0) is set to zero (e.g., $S_i$=0) and an end time for the first video segment is determined as a minimum of Td, Tm, and Ta*Rd/Rp. For example, based on the foregoing example constraints of Td, Ta, Rd, Rp and Tm, the end time of the first video segment is 1 minute. At operation 416, a first video segment of the VOD content is generated from start time $S_i$ to end time $E_i$ for i=0 (e.g., from start time 0 to end time 1). In the foregoing example, the ratio of constraints Rd/Rp is a whole number (e.g., 8 Mbps/4 MBps=2). The ratio of constraints Rd/Rp does not have to be a whole number and may vary based on the constraints Rd and Rp (e.g., 6 Mbps/4 MBps=1.5).

Operations 418-424 iteratively determine successive video segments of the VOD content. At operation 418, a determination is made as to whether end time $E_i$ is greater or equal to duration Td for any video segment starting at the first video segment indicated by i=0 (e.g., $E_i$>=Td). The determination at operation 418 establishes whether a determined end time $E_i$ for any video segment (indicted by segment counter i) is beyond the duration Td of the VOD content. If it is determined that that end time $E_i$>=duration Td, the method ends at operation 426. If it is determined that end time $E_i$<duration Td, the method 400 continues at operation 410 at which the segment counter is incremented to a successive video segment (e.g., i=i+1). At operation 422, for each successive video segment a start time is set to a previous video segment's end time (e.g., $S_i$=$E_{i-1}$) and each successive video segment's end time is determined as a minimum of Td, $S_i$+Tm, and $S_i$+($E_{i-1}$−$S_{i-1}$)*Rd/Rp. At operation 424, the successive video segment of the VOD content is generated from start time $S_i$ to end time $E_i$.

Thereafter, the method 400 continues at operation 418 for successive iterations of segment counter i.

Based on the foregoing constraints, where Td=120 minutes, Ta=½ minute, Rd=8 Mbps, Rp=4 Mbps and Tm=60 minutes, method 400 would generate a total of seven (7) segments of the successively increasing lengths: 1, 2, 4, 8, 16, 32 and 57. The total duration of the successive segments is equal to Td or 120 minutes. It is noted that except for the length of the last video segment (e.g., 57 minutes), the successive lengths of at least plural video segments are generated according to a geometric progression. In general, each successive video segment of the progression varies by a factor of Rd/Rp from a previous video segment, except the progression is modified for video segments the duration of which may be reduced to a maximum segment duration (Tm) or a last video segment the duration of which may be reduced because of a total duration (Td) of the VOD content. The foregoing constraints may be selectively adjusted to generate a different number of video segments.

Figure 5:
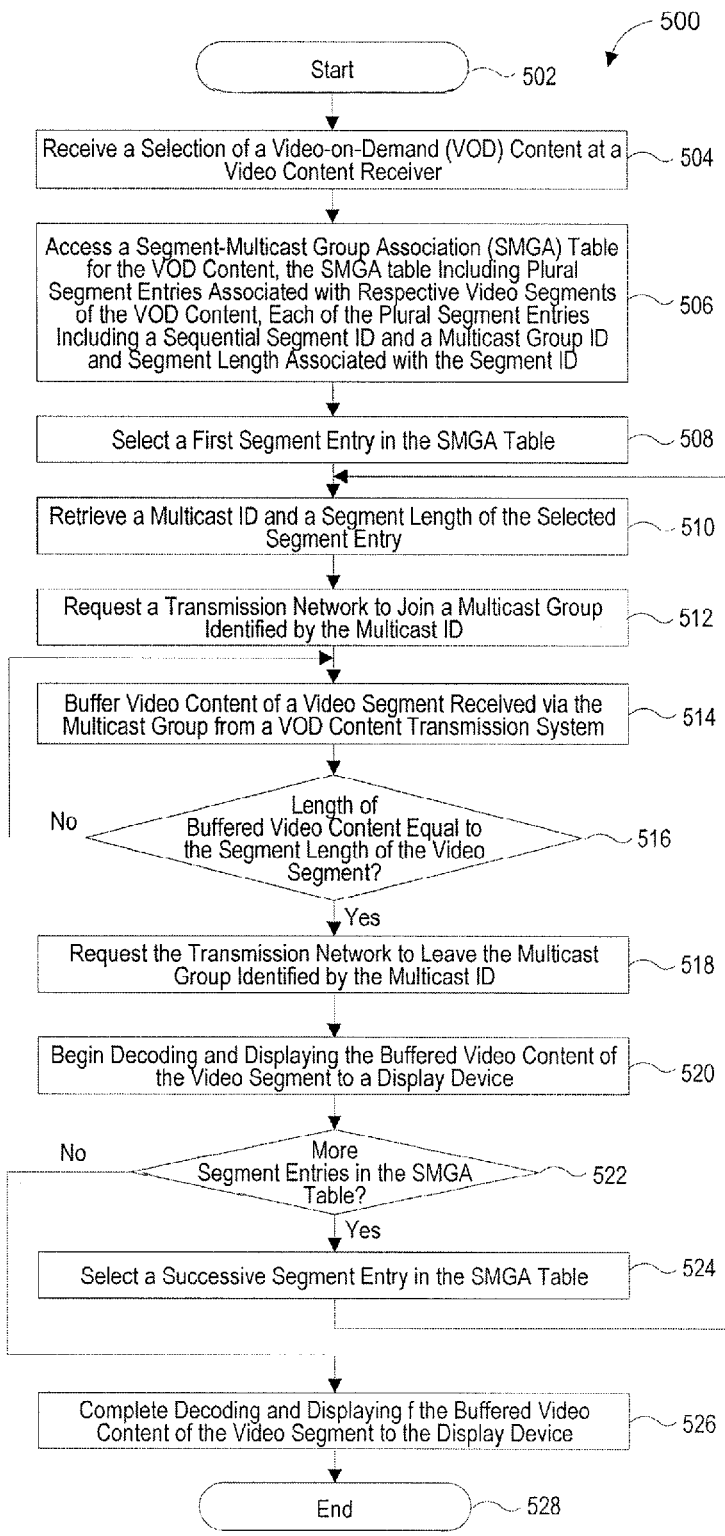
FIG. 5 is a flowchart that illustrates an example method of playing VOD content via at least one video content receiver.

FIG. 5 is a flowchart that illustrates an example method 500 of playing VOD content via at least one video content receiver. The method 500 starts at operation 502. At operation 504, a video content receiver receives a selection of VOD content. For example, VOD content may be selected by tuning to a channel associated with the VOD content via tuning module 134 or by selecting the VOD content in a VOD menu 140 of the video content receiver 132 in FIG. 1. At operation 506, a segment-multicast group association (SMGA) table for the VOD content is accessed. The SMGA table includes plural segment entries associated with respective video segments of the VOD content, with each of the segment entries including a segment ID of the associated video segment, and a multicast group ID and segment length associated with the segment ID. An example SMGA table 200 showing plural segment entries 208-216 is illustrated FIG. 2. At operation 508, a first segment entry in the SMGA is selected. For example, a first segment entry 208 in the example SMGA table 200 is selected by the receiver module 144.

Further with reference to method 500, a multicast ID and a segment length of the selected segment entry (e.g., first segment entry 208) are retrieved at operation 510. At operation 512, a join request to join a multicast group identified by the multicast group ID is transmitted to a transmission network. For example, a multicast group join/leave module 130 of the transmission network 128 may receive the join request and may further join the video content receiver to the multicast group. At operation 514, video content of a video segment received via the multicast group from a VOD content transmission system is buffered. For example, video content of a first segment is received from the first multicast group transmission module 118 of the VOD content transmission system 102 by the receiver module 144 and buffered via the video buffer 146.

Yet further with reference to method 500, at operation 516, a determination is made as to whether a length of the buffered video content is equal to the segment length of the selected segment entry of the SMGA table. If the length of the buffered video content is less than the segment length, the method 500 continues buffering the video content of the video segment at operation 514. If the length of the buffered video content is equal to the segment length, the method 500 continues at operation 518 in which a leave request to leave the multicast group identified by the multicast group ID is transmitted to a transmission network. For example, the multicast group join/ leave module 130 of the transmission network 128 may receive the leave request and may further remove the video content receiver from the multicast group identified by the multicast group ID. At operation 520, the buffered video content of the video segment is begun to be decoded and displayed via a display device. For example, the video decoder module 148 and the video display device 150 begin to decode and display, respectively, the video content to the video display device 152. It is noted that the decoding and displaying of a previous video segment is completed immediately preceding the beginning of the decoding and displaying of the video segment at operation 520 to facilitate a continuous display of the VOD content. As an alternative to comparing the length of the buffered video content to the segment length of the video segment at operation 516, a completion of display of the previous segment can be used as an indication of when to request to leave the multicast group identified by the multicast ID at operation 518 and to begin decoding and displaying the buffered video content at operation 520. When buffering a first video segment (when there is no previous video segment being displayed), an expiration of the allowable time before display begins, Ta, may be used as an alternative indication of when to leave the multicast group identified by the multicast ID and to begin displaying the buffered video content.

Still further with reference to method 500, at operation 522 a determination is made as to whether there are more segment entries in the SMGA table. If it is determined that there are more entries at operation 522, the method 400 continues at operation 524 where a successive segment entry in the SMGA table is selected. The receiver module 144 may perform operations 510-512, 516, 518, 522 and 524. For example, at operation 524, the receiver module 144 may select a successive segment entry 210 in the SMGA table 200 of FIG. 2. Thereafter, the method 400 performs operations 510-522 to receive and display a video segment associated with the successive segment entry of the SMGA table. While operations 510-518 for the video segment of the successive segment entry (e.g., segment entry 210) are performed, the decoding and displaying of the buffered video content for the video segment of the previous segment entry (e.g., segment entry 208) are completed. If it is determined that there are no more entries at operation 522, the method 500 continues at operation 526 where the decoding and displaying of the buffered video content for the video segment is completed. The method 500 ends at operation 528.

Figure 6:
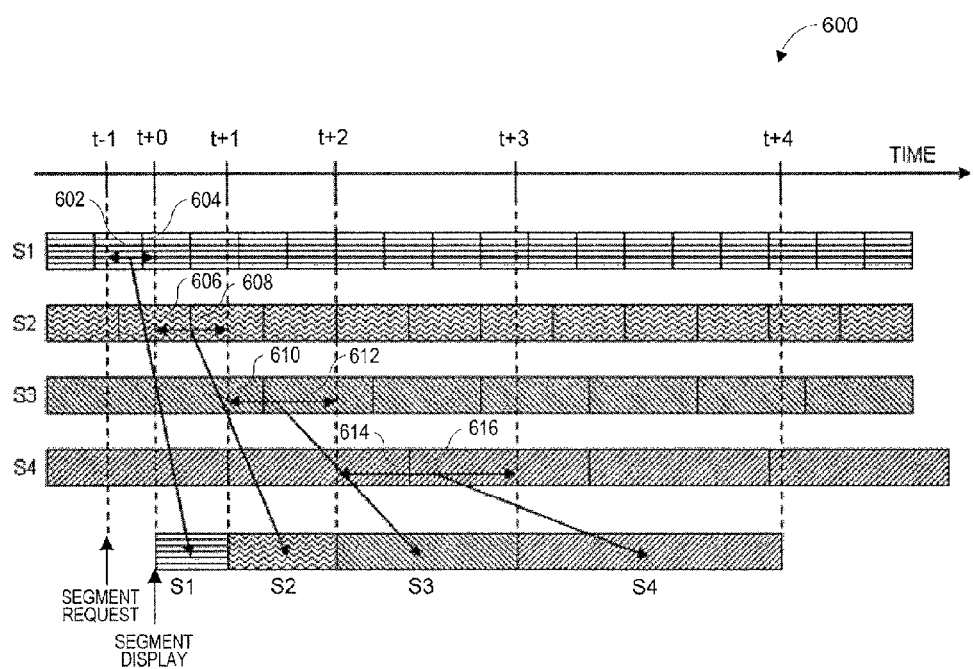
FIG. 6 is a timeline that illustrates transmission and display of video segments of VOD content to at least one video content receiver.

FIG. 6 is an example timeline 600 that illustrates transmission and display of plural video segments of VOD content to at least one video content receiver. More specifically, the first four horizontal bars of the example timeline 600 illustrate four (4) example video segments S1-S4 of example VOD content. The video segments S1-S4 are continuously multicast via their respective multicast groups. A pair of solid vertical lines in each of the video segments S1-S4 indicates the respective time of transmission of the video segment. As illustrated in FIG. 6, multiple pairs of vertical bars indicate looping multicast transmissions of the example video segments of the VOD content. Vertical dashed lines represent requests made by a video content receiver (e.g., video content receiver 132) for the example video segments S1-S4. A last horizontal bar of the example timeline 600 illustrates video segment display by a video content receiver (e.g., video content receiver 132). The successive video segments S1-S4 are of successively longer lengths, which may be generated according to a geometric progression as will be described below. As is shown in FIG. 6, a transmission rate of a segment (e.g., video segment S2) is faster than a display rate of the same video segment (e.g., video segment S2). As is further shown in FIG. 6, the transmission rate of a segment (e.g., video segment S2) is equal to or greater than a display rate of a previous video segment (e.g., video segment S1). The transmission and display rates in relation to the other example video segments follows a similar pattern as between video segment S1 and video segment S2 described immediately above.

As an example, a video content receiver (e.g., video content receiver 132) requests to join a multicast group associated with the segment S1 at an arbitrary time, t−1, which is after an associated multicast group transmission module (e.g., multicast transmission module 118) had begun to transmit the video segment S1. The receiver has access to a SMGA table that indicates the multicast groups S1-S4.

Between t−1 and t+0, the video content receiver buffers video segment S1 (video content potions 602, 604), reordering the video content portions 602, 604 as necessary. At t+0, the video content receiver requests to leave the multicast group associated with the segment S1.

Between t+0 and t+1, the video content receiver (e.g., video content receiver 132) begins to decode and display video segment S1 to an associated video display device (e.g., video display device 152). Concurrently with the beginning of decoding and display of video segment S1 between t+0 and t+1, the video content receiver (e.g., video content receiver 132) requests to join a multicast group associated with the video segment S2 and buffers video segment S2 (video content potions 606, 608), reordering the video content portions 606, 608 as necessary. Video segment S2 is buffered while the decoding and displaying of video segment S1 are being performed. At t+1, the video content receiver requests to leave the multicast group associated with the segment S2.

Between t+1 and t+2, the video content receiver (e.g., video content receiver 132) begins to decode and display video segment S2 to an associated video display device (e.g., video display device 152). Concurrently with the beginning of decoding and display of video segment S2 between t+1 and t+2, the video content receiver (e.g., video content receiver 132) requests to join a multicast group associated with the video segment S3 and buffers video segment S3 (video content potions 610, 612), reordering the video content portions 610, 612 as necessary. At t+2, the video content receiver requests to leave the multicast group associated with the segment S3.

Between t+2 and t+3, the video content receiver (e.g., video content receiver 132) begins to decode and display video segment S3 to an associated video display device (e.g., video display device 152). Concurrently with the beginning of decoding and display of video segment S3 between t+2 and t+3, the video content receiver (e.g., video content receiver 132) requests to join a multicast group associated with the video segment S4 and buffers video segment S4 (video content potions 614, 616), reordering the video content portions 614, 616 as necessary. Video segment S4 is buffered while the decoding and displaying of video segment S3 are being performed. At t+3, the video content receiver requests to leave the multicast group associated with the segment S4.

Between t+3 through t+4, the video content receiver (e.g., video content receiver 132) decodes and displays video segment S4. This completes the display of video segments S1-S4 of VOD content.

The foregoing example timeline 600 illustrates plural example video segments S1-S4 of increasing length that are transmitted in loops via different multicast groups. This segmentation and transmission facilitates receipt of the successive video segments via different multicast groups for display via a single channel of a video content receiver (e.g., video content receiver 132). As an example, assume a case where 10,000 video content receivers 132, 156 display a 2 hour movie (VOD content) over a 24 hour period with a rate of download Rd=8 Mbps, a rate of presentation Rp=4 Mbps, an allowable time before the movie is to start displaying Ta=½ minute, and with the VOD content transmission system 102 transmitting all of the video segments for the entire 24 hour period. In the foregoing example, 7 segments of lengths 1, 2, 4, 8, 16, 32, and 57 minutes will be generated and transmitted by the VOD content transmission system 102. A total number of bits transmitted by the VOD content transmission system 102 will be a product of 7 multicast group transmission modules 118-124 multiplied by 8 Mbps per transmission module and further multiplied by 86,400 seconds in the 24 hours, which is roughly 4.8 terabits with a constant transmission rate of 56 Mbps (e.g., 7 multicast group transmission modules multiplied by a rate of download Rd of 8 Mbps). The transmission of individual copies of the movie (VOD content) to each video content receiver 132,156 would require 10,000 copies multiplied by 7,200 seconds per copy and further multiplied by 8 Mbps, which is roughly 288 terabits with an average transmission rate of about 3.3 Gbps and an even higher peak transmission rate.

Figure 7:
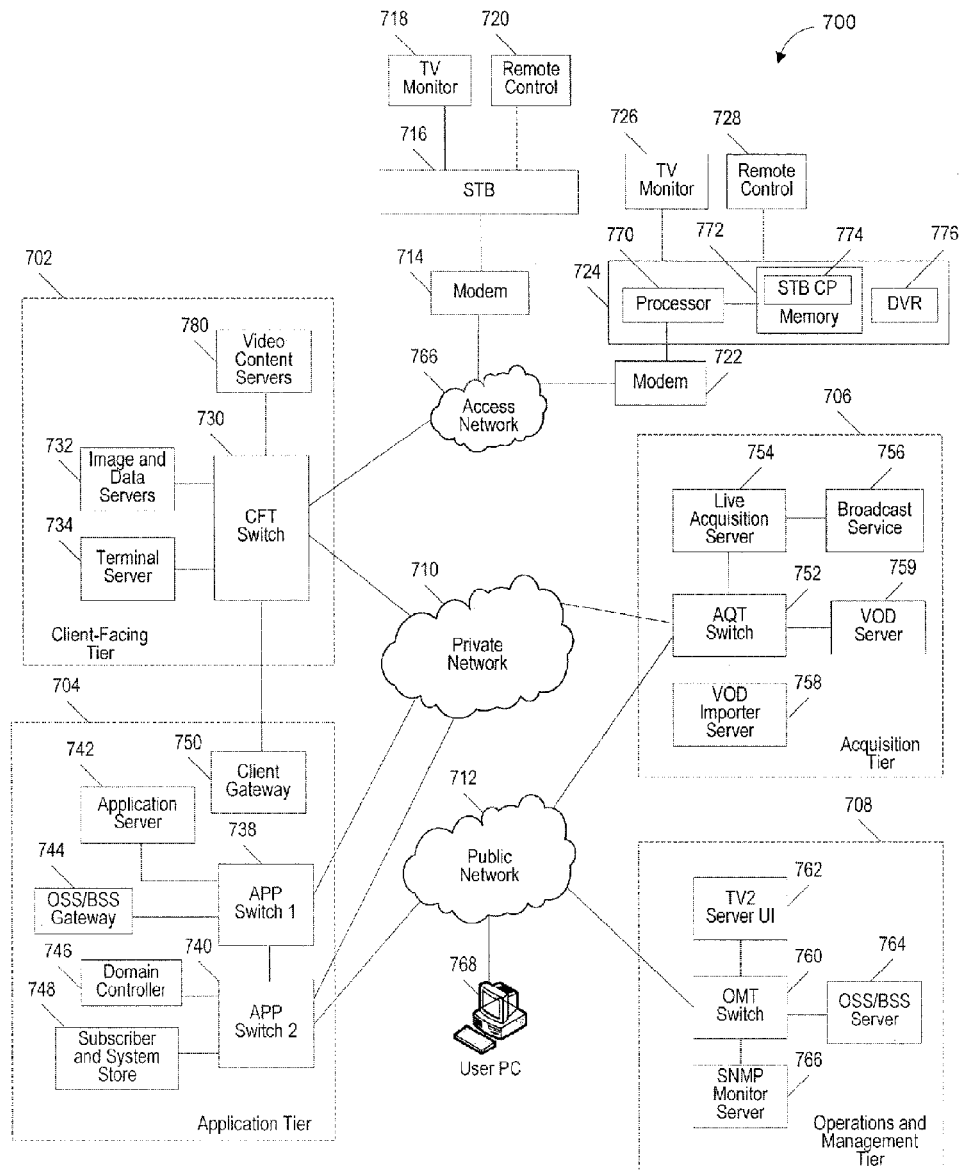
FIG. 7 is an example embodiment of an Internet Protocol Television (IPTV) system that may be used to distribute VOD to at least one set top box device.

FIG. 7 is a block diagram that illustrates an embodiment of an internet protocol television (IPTV) system configured to distribute VOD content to at least one set top box device 716, 724. More specifically, IPTV system 700 that may be used to multicast plural video segments of VOD content to at least one set top box device 716, 724. As shown, the IPTV system 700 can include a client facing tier 702, an application tier 704, an acquisition tier 706, and an operations and management tier 708.

Each tier 702, 704, 706, 708 is coupled to a private network 710; to a public network 712, such as the Internet; or to both the private network 710 and the public network 712. For example, the client-facing tier 702 may be coupled to the private network 710. Further, the application tier 704 may be coupled to the private network 710 and to the public network 712. The acquisition tier 706 may also be coupled to the private network 710 and to the public network 712. Additionally, the operations and management tier 708 may be coupled to the public network 712.

The various tiers 702, 704, 706, 708 communicate with each other via the private network 710 and the public network 712. For instance, the client-facing tier 702 may communicate with the application tier 704 and the acquisition tier 706 via the private network 710. The application tier 704 may also communicate with the acquisition tier 706 via the private network 710. Further, the application tier 704 may communicate with the acquisition tier 706 and the operations and management tier 708 via the public network 712. Moreover, the acquisition tier 706 may communicate with the operations and management tier 708 via the public network 712. In a particular embodiment, elements of the application tier 704, including, but not limited to, a client gateway 750, may communicate directly with the client-facing tier 702.

The client-facing tier 702 may communicate with user equipment via a private access network 766, such as an Internet Protocol Television (IPTV) access network. In an illustrative embodiment, modems, such as a first modem 714 and a second modem 722 may be coupled to the private access network 766. The client-facing tier 702 may communicate with a first representative set top box device 716 via the first modem 714 and with a second representative set top box device 724 via the second modem 722. The client-facing tier 702 may communicate with a large number of set top boxes, such as the representative set top boxes 716, 724, over a wide geographic area, such as a regional area, a metropolitan area, a viewing area, a designated market area or any other suitable geographic area, market area, or subscriber or customer group that may be supported by networking the client-facing tier 702 to numerous set top box devices. In an illustrative embodiment, the client-facing tier, or any portion thereof, may be included at a video head-end office.

In a particular embodiment, the client-facing tier 702 may be coupled to the modems 714, 722 via fiber optic cables. Alternatively, the modems 714 and 722 may be digital subscriber line (DSL) modems that are coupled to one or more network nodes via twisted pairs, and the client-facing tier 702 may be coupled to the network nodes via fiber-optic cables. Each set top box device 716, 724 may process data received via the private access network 766, via an IPTV software platform, such as Microsoft® TV IPTV Edition.

Additionally, the first set top box device 716 may be coupled to a first external display device, such as a first television monitor 718, and the second set top box device 724 may be coupled to a second external display device, such as a second television monitor 726. Moreover, the first set top box device 716 may communicate with a first remote control device 720, and the second set top box device may communicate with a second remote control device 728.

In an example embodiment, each set top box device 716, 724 may receive video content (including VOD content), which may include video and audio portions, from the client-facing tier 702 via the private access network 766. The set top boxes 716, 724 may transmit the video content to an external display device, such as the television monitors 718, 726. Further, the set top box devices 716, 724 may each include a STB processor, such as STB processor 770, and a STB memory device, such as STB memory 772, which is accessible to the STB processor 770. In one embodiment, a computer program, such as the STB computer program 774, may be embedded within the STB memory device 772. The STB computer program 774 may perform the functionality described with reference to the video content receiver 132 of FIG. 1 and the methodology described with reference to the method 500 of FIG. 5. Each set top box device 716, 724 may also include a video content storage module, such as a digital video recorder (DVR) 776. In a particular embodiment, the set top box devices 716, 724 may communicate commands received from the remote control devices 720, 728 to the client-facing tier 702 via the private access network 766.

In an illustrative embodiment, the client-facing tier 702 may include a client-facing tier (CFT) switch 730 that manages communication between the client-facing tier 702 and the private access network 766 and between the client-facing tier 702 and the private network 710. As shown, the CFT switch 730 is coupled to one or more image and data servers 732 that store still images associated with programs of various IPTV channels. The image and data servers 732 may also store data related to various channels, e.g., types of data related to the channels and to programs or video content displayed via the channels. In an illustrative embodiment, the image and data servers 732 may be a cluster of servers, each of which may store still images, channel and program-related data, or any combination thereof. The CFT switch 730 may also be coupled to a terminal server 734 that provides terminal devices with a connection point to the private network 710. The client-facing tier 702 may also include one or more video content servers 780 that transmit video content requested by viewers via their set top boxes 716, 724. In an illustrative, non-limiting embodiment, the video content servers 780 may include one or more multicast servers.

The application tier 704 may communicate with both the private network 710 and the public network 712. The application tier 704 may include a first application tier (APP) switch 738 and a second APP switch 740. In a particular embodiment, the first APP switch 738 may be coupled to the second APP switch 740. The first APP switch 738 may be coupled to an application server 742 and to an OSS/BSS gateway 744. In a particular embodiment, the application server 742 may provide applications to the set top box devices 716, 724 via the private access network 766, which enable the set top box devices 716, 724 to provide functions, such as display, messaging, processing of IPTV data and VOD content, as well as other functions. In a particular embodiment, the OSS/BSS gateway 744 includes operation systems and support (OSS) data, as well as billing systems and support (BSS) data. In one embodiment, the OSS/BSS gateway may provide or restrict access to an OSS/BSS server 764 that stores operations and billing systems data.

Further, the second APP switch 740 may be coupled to a domain controller 746 that provides web access, for example, to users via the public network 712. For example, the domain controller 746 may provide remote web access to IPTV account information via the public network 712, which users may access using their personal computers 768. The second APP switch 740 may be coupled to a subscriber and system store 748 that includes account information, such as account information that is associated with users who access the IPTV system 700 via the private network 710 or the public network 712. In a particular embodiment, the application tier 704 may also include a client gateway 750 that communicates data directly with the client-facing tier 702. In this embodiment, the client gateway 750 may be coupled directly to the CFT switch 730. The client gateway 750 may provide user access to the private network 710 and the tiers coupled thereto.

In a particular embodiment, the set top box devices 716, 724 may access the IPTV system 700 via the private access network 766, using information received from the client gateway 750. In this embodiment, the private access network 766 may provide security for the private network 710. User devices may access the client gateway 750 via the private access network 766, and the client gateway 750 may allow such devices to access the private network 710 once the devices are authenticated or verified. Similarly, the client gateway 750 may prevent unauthorized devices, such as hacker computers or stolen set top box devices from accessing the private network 710, by denying access to these devices beyond the private access network 766.

For example, when the first representative set top box device 716 accesses the system 700 via the private access network 766, the client gateway 750 may verify subscriber information by communicating with the subscriber and system store 748 via the private network 710, the first APP switch 738, and the second APP switch 740. Further, the client gateway 750 may verify billing information and status by communicating with the OSS/BSS gateway 744 via the private network 710 and the first APP switch 738. In one embodiment, the OSS/BSS gateway 744 may transmit a query across the first APP switch 738, to the second APP switch 740, and the second APP switch 740 may communicate the query across the public network 712 to the OSS/BSS server 764. After the client gateway 750 confirms subscriber and/or billing information, the client gateway 750 may allow the set top box device 716 access to IPTV content and VOD content. If the client gateway 750 cannot verify subscriber information for the set top box device 716, e.g., because it is connected to an unauthorized twisted pair, the client gateway 750 may block transmissions to and from the set top box device 716 beyond the private access network 166.

The acquisition tier 706 includes an acquisition tier (AQT) switch 752 that communicates with the private network 710.

The AQT switch 752 may also communicate with the operations and management tier 708 via the public network 712. In a particular embodiment, the AQT switch 752 may be coupled to a live acquisition server 754 that receives television or movie content, for example, from a broadcast service 756. In a particular embodiment during operation of the IPTV system, the live acquisition server 754 may acquire television or movie content. The live acquisition server 754 may transmit the television or movie content to the AQT switch 752 and the AQT switch 752 may transmit the television or movie content to the CFT switch 730 via the private network 710.

Further, the television or movie content may be transmitted to the video content servers 780, where it may be encoded, formatted, stored, or otherwise manipulated and prepared for communication to the set top box devices 716, 724. The CFT switch 730 may communicate the television or movie content to the modems 714, 722 via the private access network 166. The set top box devices 716, 724 may receive the television or movie content via the modems 714, 722, and may transmit the television or movie content to the television monitors 718, 726. In an illustrative embodiment, video or audio portions of the television or movie content may be streamed to the set top box devices 716, 724.

Further, the AQT switch 752 may be coupled to a video-on-demand importer server 758 that imports television or movie content (VOD content) received at the acquisition tier 706 and communicates the imported VOD content to a video-on-demand (VOD) server 759 also coupled to the AQT switch 752. In a particular embodiment, VOD server 759 may store and provide VOD content imported by the VOD importer server 758 to the IPTV system 700 via AQT switch 752 and CFT switch 730. More specifically, the VOD server 759 may transmit the VOD content to the AQT switch 752, and the AQT switch 752, in turn, may communicate the VOD content to the CFT switch 730 via the private network 710. VOD server 759 may perform the functionality of the VOD content transmission system 102 of FIG. 1, the methodology of method 300 of FIG. 3 and the methodology of method 400 of FIG. 4. Additionally, at the acquisition tier 706, the VOD importer server 758 may receive content from one or more VOD sources outside the IPTV system 700, such as movie studios and programmers of non-live content.

When users issue requests for VOD content via the set top box devices 716, 724, the requests may be transmitted over the private access network 766 via CFT switch 730 and over private network 710 via AQT switch 752 to the VOD server 759. Upon receiving such requests, the VOD server 759 may retrieve the requested VOD content and transmit the content to the set top box devices 716, 724 across the private network 710 and the access network 766, via the AQT switch 752 and the CFT switch 730, respectively. The set top box devices 716, 724 may transmit the VOD content to the television monitors 718, 726. In an illustrative embodiment, video or audio portions of VOD content are multicast to the set top box devices 716, 724 in accordance with the functionality and methodology described in this application.

FIG. 7 further illustrates that the operations and management tier 708 may include an operations and management tier (OMT) switch 760 that conducts communication between the operations and management tier 708 and the public network 712. In the embodiment illustrated by FIG. 7, the OMT switch 760 is coupled to a TV2 server 762. Additionally, the OMT switch 760 may be coupled to an OSS/BSS server 764 and to a simple network management protocol (SNMP) monitor 770 that monitors network devices within or coupled to the IPTV system 700. In a particular embodiment, the OMT switch 760 may communicate with the AQT switch 752 via the public network 712.

In an illustrative embodiment, the live acquisition server 754 may transmit the television or movie content to the AQT switch 752, and the AQT switch 752, in turn, may transmit the television or movie content to the OMT switch 760 via the public network 712. In this embodiment, the OMT switch 760 may transmit the television or movie content to the TV2 server 762 for display to users accessing the user interface at the TV2 server 762. For example, a user may access the TV2 server 762 using a personal computer (PC) 768 coupled to the public network 712.

Figure 8:
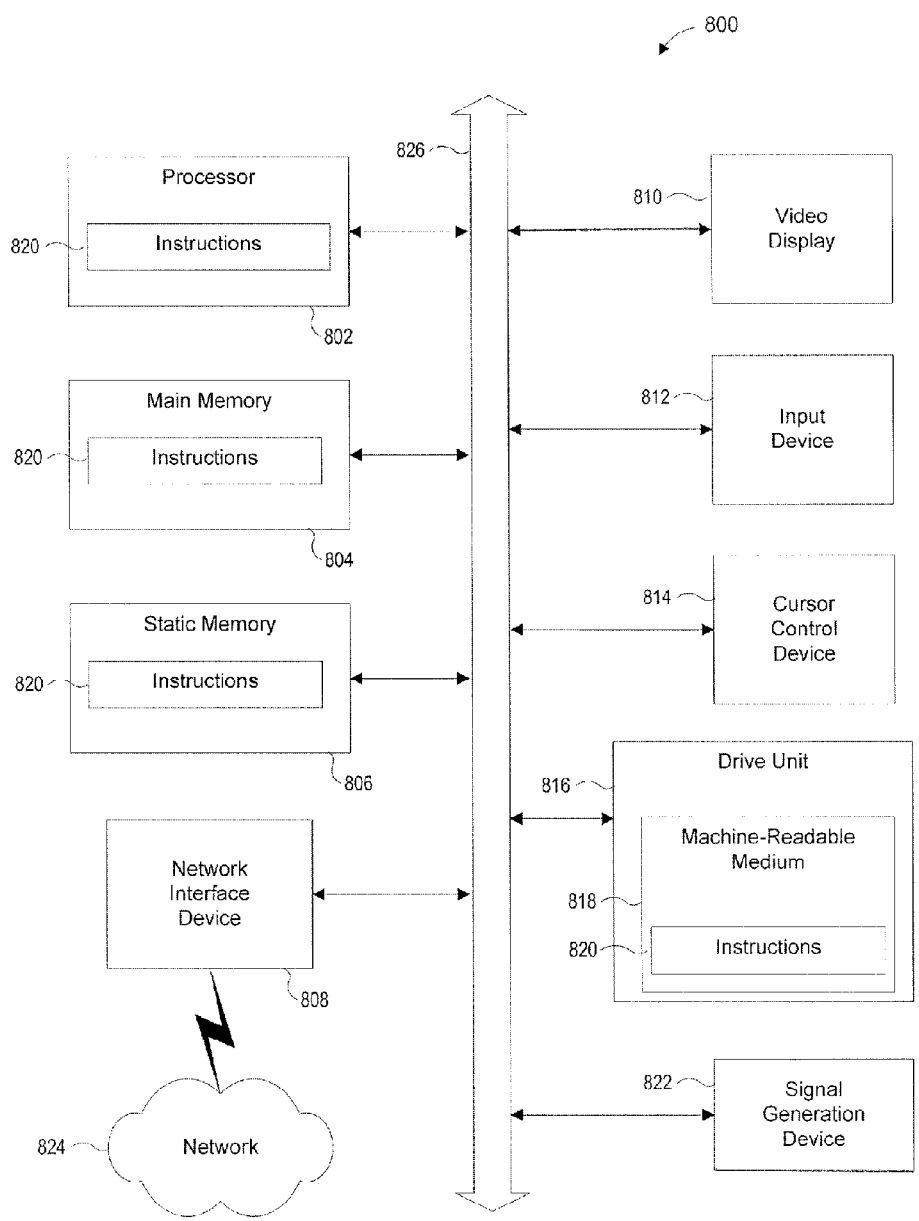
FIG. 8 is a block diagram that illustrates a general computer system.

FIG. 8 is a block diagram that illustrates a general computer system 800. The computer system 800 may include a set of instructions that may be executed to cause the computer system 800 to perform any one or more of the computer based functions or methods disclosed herein. The computer system 800, or any portion thereof, may operate as a standalone device or may be connected, e.g., using a network, to other computer systems or peripheral devices.

In a networked deployment, the computer system 800 may operate in the capacity of an Internet Protocol television (IPTV) server, such as a video-on-demand (VOD) server or application server, or video content receiver, such as a set-top box (STB) device. The computer system 800 may also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 may include a main memory 804 and a static memory 806 that may communicate with each other via a bus 826. As shown, the computer system 800 may further include a video display unit 810, such as a liquid crystal display (LCD), an organic light emitting diode (OLED), a projection unit, a television, a flat panel display, a solid state display, or a cathode ray tube (CRT). Additionally, the computer system 800 may include an input device 812, such as a keyboard, and a cursor control device 814, such as a mouse. The computer system 800 may also include a disk drive unit 816, a signal generation device 822, such as a speaker or remote control, and a network interface device 808.

In a particular embodiment, as depicted in FIG. 8, the disk drive unit 816 may include a computer-readable medium 818 in which one or more sets of instructions 820, e.g., software, may be embedded. Further, the instructions 820 may embody one or more of the methods or logic as described herein. In a particular embodiment, the instructions 820 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations may include distributed processing, component/object distributed processing, and parallel processing. Alternatively, virtual computer system processing may be constructed to implement one or more of the methods or functionality as described herein.

The present application contemplates a computer-readable medium that includes instructions 820 or receives and executes instructions 820 responsive to a propagated signal, so that a device connected to a network 824 may communicate voice, video or data over the network 824. Further, the instructions 820 may be transmitted or received over the network 824 via the network interface device 808.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a medium that is equivalent to a tangible storage medium. Accordingly, the application is considered to include any one or more of a computer-readable medium and other equivalents and successor media, in which data or instructions may be stored.

Although the present application describes components and functions that may be implemented in particular embodiments with reference to particular standards and protocols, the application is not limited to such standards and protocols. Such standards and protocols are periodically superseded by faster or more efficient equivalents having essentially the same functions. Accordingly, replacement standards and protocols having the same or similar functions as those disclosed herein are considered equivalents thereof.

Thus, a system, method and computer-readable storage medium to distribute video-on-demand (VOD) content to at least one video content receiver have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this application. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept. Thus, although specific embodiments have been illustrated and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein, will be apparent to those of skill in the art upon reviewing the above description.

The Abstract is provided to comply with 37 C.F.R. §1.72(b) and will allow the reader to quickly ascertain the nature of the technical disclosure of this application. It is submitted with the understanding that it will not be used to interpret or limit the scope or meaning of the claims.

In the foregoing description of the embodiments, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

What is claimed is:

1. A method of displaying video content, the method comprising:
   receiving, using a video content receiver, a first video segment of video-on-demand content using a first multicast group identification, the first video segment having a first length;
   receiving a duration of the video-on-demand content;
   displaying, using the video content receiver, the first video segment at a presentation rate; and
   receiving, using the video content receiver, a second video segment of the video-on-demand content at a download rate using a second multicast group identification within a period of time of displaying the first video segment, the second video segment having a second length that is longer than the first length in accordance with a geometric progression, the geometric progression based on a ratio of the download rate and the presentation rate, the download rate is greater than the presentation rate, wherein an ith video segment of the video-on-demand content is received, the ith video segment having a length that is shorter than the second length as adjusted based on the duration of the video-on-demand content.

2. The method of displaying video content of claim 1, further comprising displaying the second video segment immediately after displaying the first video segment to facilitate continuous display of the video content.

3. The method of displaying video content of claim 1, further comprising receiving a user selection of the video content.

4. The method of displaying video content of claim 3, wherein receiving a user selection of the video content comprises:
   receiving selection of a channel associated with the video content; and
   associating the channel with an association table using a channel map, the association table comprising:
      a first segment entry associated with the first video segment, the first segment entry including the first multicast group identification; and
      a second segment entry associated with the second video segment, the second segment entry including the second multicast group identification.

5. The method of displaying video content of claim 3, wherein receiving the user selection of the video content comprises:
   receiving an entry in a menu of the video content, the entry associating the video content with a channel; and
   associating the channel with an association table using a channel map, the association table comprising:
      a first segment entry associated with the first video segment, the first segment entry including the first multicast group identification; and
      a second segment entry associated with the second video segment, the second segment entry including the second multicast group identification.

6. The method of displaying video content of claim 1, further comprising receiving the first video segment at the download rate.

7. The method of displaying video content of claim 1, further comprising:
   receiving a plurality of parameters associated with the video content; and
   generating an association table using the plurality of parameters, the association table comprising:
      a first segment entry associated with the first video segment, the first segment entry including the first multicast group identification; and
      a second segment entry associated with the second video segment, the second segment entry including the second multicast group identification.

8. A video content receiver to display video content, the video content receiver comprising:
   a processor; and
   a computer-readable storage device to store instructions that, when executed by the processor, cause the processor to perform operations comprising:
      receiving a first video segment of video-on-demand content using a first multicast group identification, the first video segment having a first length;
      displaying the first video segment at a presentation rate; and
      receiving a second video segment of the video-on-demand content at a download rate using a second multicast group identification within a period of time of displaying the first video segment, the second video segment having a second length that is longer than the first length in accordance with a geometric progression, the geometric progression based on a ratio of the download rate and the presentation rate, the download rate is greater than the presentation rate, wherein an $i^{th}$ video segment of the video-on-demand content is received, the $i^{th}$ video segment having a length that is shorter than the second length as adjusted based on a duration of the video-on-demand content.

9. The video content receiver of claim 8, wherein the operations further comprise displaying the second video segment immediately after display the first video segment to facilitate continuous display of the video content.

10. The video content receiver of claim 8, wherein the operations further comprise receiving a user selection of the video content.

11. The video content receiver of claim 10, wherein the operations further comprise:
    receiving a selection of a channel associated with the video content; and
    associating the channel with an association table using a channel map, the association table comprising:
       a first segment entry associated with the first video segment, the first segment entry including the first multicast group identification; and
       a second segment entry associated with the second video segment, the second segment entry including the second multicast group identification.

12. The video content receiver of claim 10, wherein the operations further comprise:
    receiving an entry in a menu of the video content, the entry associating the video content with a channel; and
    associate the channel with an association table using a channel map, the association table comprising:
       a first segment entry associated with the first video segment, the first segment entry including the first multicast group identification; and
       a second segment entry associated with the second video segment, the second segment entry including the second multicast group identification.

13. The video content receiver of claim 8, wherein the operations further comprise receiving the first video segment at the download rate.

14. The video content receiver of claim 8, wherein the operations further comprise:
    receiving a plurality of parameters associated with the video content; and
    generating an association table using the plurality of parameters, the association table comprising:
       a first segment entry associated with the first video segment, the first segment entry including the first multicast group identification; and
       a second segment entry associated with the second video segment, the second segment entry including the second multicast group identification.

15. A computer-readable storage device storing instructions that, when executed by a processor, cause the processor to perform operations comprising:
    receiving a first video segment of video-on-demand content using a first multicast group identification, the first video segment having a first length;
    receiving a duration of the video-on-demand content;
    displaying the first video segment at a presentation rate; and
    receiving a second video segment at a download rate using a second multicast group identification within a period of time of displaying the first video segment, the second video segment having a second length that is longer than the first length in accordance with a geometric progression, the geometric progression based on a ratio of the download rate and the presentation rate, the download rate greater than the presentation rate, wherein an $i^{th}$ video segment of the video-on-demand content is received, the $i^{th}$ video segment having a length that is shorter than the second length as adjusted based on the duration of the video-on-demand content.

16. The computer-readable storage device of claim 15, wherein the operations further comprise displaying the second video segment immediately after displaying the first video segment to facilitate continuous display of the video content.

17. The computer-readable storage device of claim 15, wherein the operations further comprise receiving a user selection of the video content.

18. The computer-readable storage device of claim 17, wherein the operations further comprise:
receiving a selection of a channel associated with the video content; and
associating the channel with an association table using a channel map, the association table comprising:
a first segment entry associated with the first video segment, the first segment entry including the first multicast group identification; and
a second segment entry associated with the second video segment, the second segment entry including the second multicast group identification.

19. The computer-readable storage device of claim 17, wherein the operations further comprise:
receiving an entry in a menu of the video content, the entry associating the video content with a channel; and
associating the channel with an association table using a channel map, the association table comprising:
a first segment entry associated with the first video segment, the first segment entry including the first multicast group identification; and
a second segment entry associated with the second video segment, the second segment entry including the second multicast group identification.

20. The computer-readable storage device of claim 15, wherein the operations further comprise:
receiving a plurality of parameters associated with the video content; and
generating an association table using the plurality of parameters, the association table comprising:
a first segment entry associated with the first video segment, the first segment entry including the first multicast group identification; and
a second segment entry associated with the second video segment, the second segment entry including the second multicast group identification.

* * * * *